(12) United States Patent
Yim et al.

(10) Patent No.: US 7,898,635 B2
(45) Date of Patent: Mar. 1, 2011

(54) DISPLAY PANEL WITH A CONDUCTIVE SPACER THAT CONNECTS A COMMON VOLTAGE LINE AND A COMMON ELECTRODE

(75) Inventors: Bae-Heuk Yim, Asan-si (KR); Jeong-Ho Lee, Seoul (KR); Doo-Hwan You, Gwangmyeong-Si (KR); Seong-Young Lee, Anyang-Si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 53 days.

(21) Appl. No.: 11/871,526

(22) Filed: Oct. 12, 2007

(65) Prior Publication Data
US 2008/0088787 A1    Apr. 17, 2008

(30) Foreign Application Priority Data

Oct. 16, 2006  (KR) .................. 10-2006-0100435

(51) Int. Cl.
*G02F 1/1339* (2006.01)
(52) U.S. Cl. ................ 349/155; 349/153; 349/190
(58) Field of Classification Search .............. 349/155
See application file for complete search history.

(56) References Cited

U.S. PATENT DOCUMENTS

| 6,466,294 | B1 * | 10/2002 | Yamagishi et al. | 349/155 |
| 2001/0020995 | A1 * | 9/2001 | Kim | 349/149 |
| 2005/0046778 | A1 * | 3/2005 | Hsiao et al. | 349/153 |
| 2006/0139556 | A1 | 6/2006 | Ahn | |
| 2007/0002264 | A1 * | 1/2007 | Kim | 349/156 |

FOREIGN PATENT DOCUMENTS

| GB | 2421627 | 6/2006 |
| GB | 2421627 | 8/2007 |
| JP | 2002-258312 | 9/2002 |
| KR | 2000-27744 | 5/2000 |
| KR | 10-2004-34744 | 4/2004 |

OTHER PUBLICATIONS

European Search Report dated Apr. 4, 2008.

* cited by examiner

*Primary Examiner* — Richard H Kim
(74) *Attorney, Agent, or Firm* — H.C. Park & Associates, PLC

(57) ABSTRACT

A liquid crystal display includes a conductive spacer that connects a common voltage line of an array substrate to a common electrode of an opposite substrate. The conductive spacer has a bar-like shape and extends along the common voltage line.

12 Claims, 12 Drawing Sheets

DISPLAY PANEL WITH A CONDUCTIVE SPACER THAT CONNECTS A COMMON VOLTAGE LINE AND A COMMON ELECTRODE

CROSS-REFERENCE TO RELATED APPLICATION

This application claims priority from and the benefit of Korean Patent Application No. 10-2006-0100435, filed on Oct. 16, 2006, which is hereby incorporated by reference for all purposes as if fully set forth herein.

BACKGROUND OF THE INVENTION

1. Field of the Invention

The present invention relates to a display panel. More particularly, the present invention relates to a display panel that may have improved productivity.

2. Discussion of the Background

In general, a liquid crystal display (LCD) includes an LCD panel displaying an image thereon. The LCD panel includes an array substrate, an opposite substrate coupled with the array substrate and facing the array substrate, and a liquid crystal layer interposed between the array substrate and the opposite substrate.

The array substrate includes a plurality of pixel electrodes arranged thereon, and the opposite substrate includes a common electrode arranged thereon to face the pixel electrodes. Data signals having image information may be applied to the pixel electrodes, and a common voltage may be applied to the common electrode.

Various signals needed to display an image may be applied to the array substrate, so that an external device may be connected to the array substrate without any direct connection to the opposite substrate. Thus, the array substrate may further include a common voltage line to receive the common voltage applied by the external device and a conductive spacer to connect the common voltage line and the common electrode in order to apply the common voltage to the common electrode of the opposite substrate. Consequently, the common voltage may be applied to the common electrode through the common voltage line and the conductive spacer.

The conductive spacer may have a point-like shape and the number of the conductive spacers increases as the size of the LCD panel increases, resulting in increased process time and decreased productivity. Also, the conductive spacer may contact the array substrate and the opposite substrate in a point-contact, which may increase the contact resistance between the array substrate and the opposite substrate. When the contact resistance between the array substrate and the opposite substrate increases, crosstalk may occur in the LCD panel, which may deteriorate the display quality of the LCD.

SUMMARY OF THE INVENTION

The present invention provides a display panel that may have improved productivity.

Additional features of the invention will be set forth in the description which follows, and in part will be apparent from the description, or may be learned by practice of the invention.

The present invention discloses a display panel including an array substrate, an opposite substrate, and a conductive spacer member. The array substrate includes a plurality of pixels to display an image and a common voltage line to transmit a common voltage. The opposite substrate includes a common electrode to receive the common voltage from the common voltage line. A part of the conductive spacer member is arranged between the common electrode and the common voltage line to connect the common electrode to the common voltage line, and the conductive spacer member has a bar-like shape and extends along the common voltage line.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
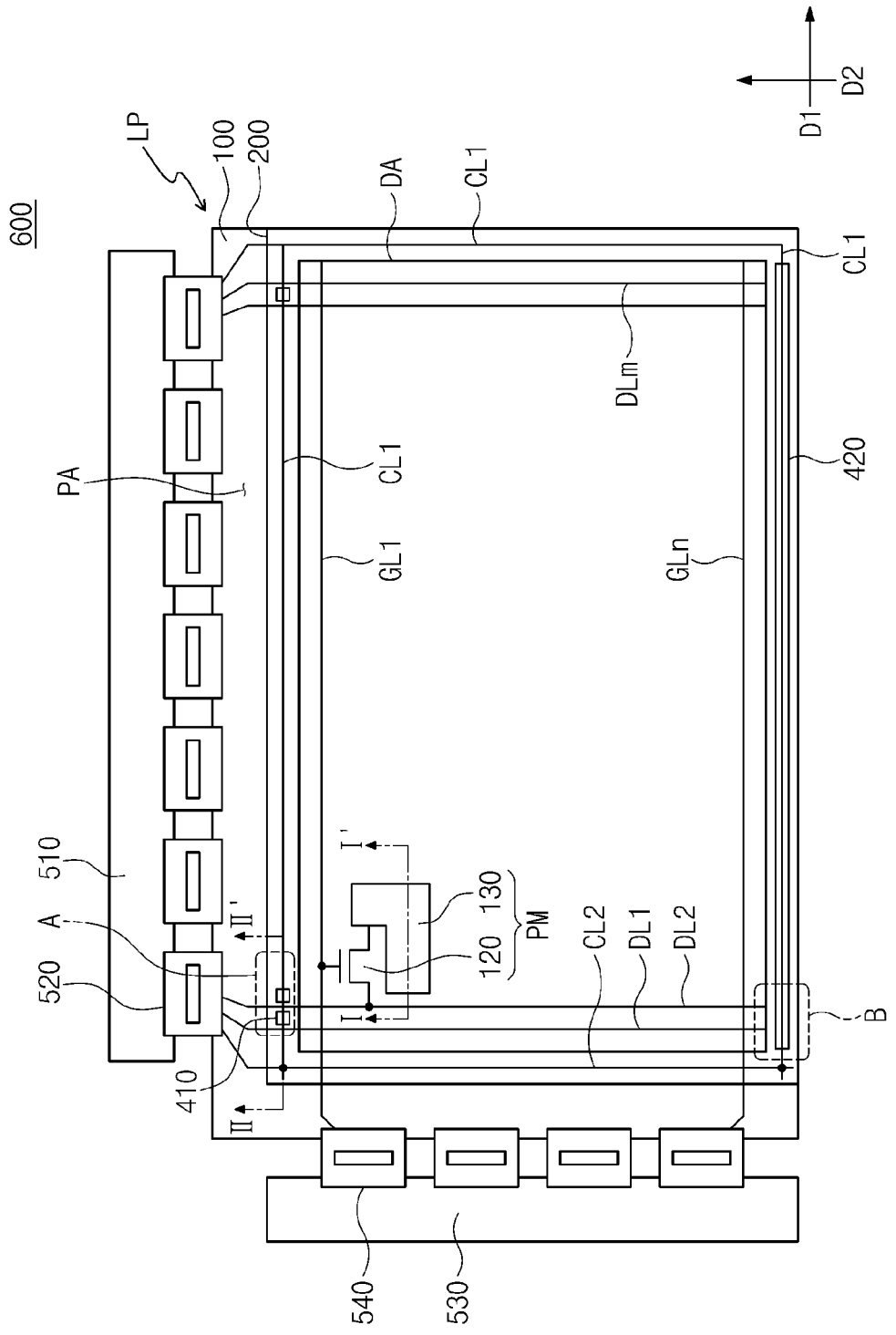
FIG. 1 is a plan view showing a liquid crystal display according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Figure 2:
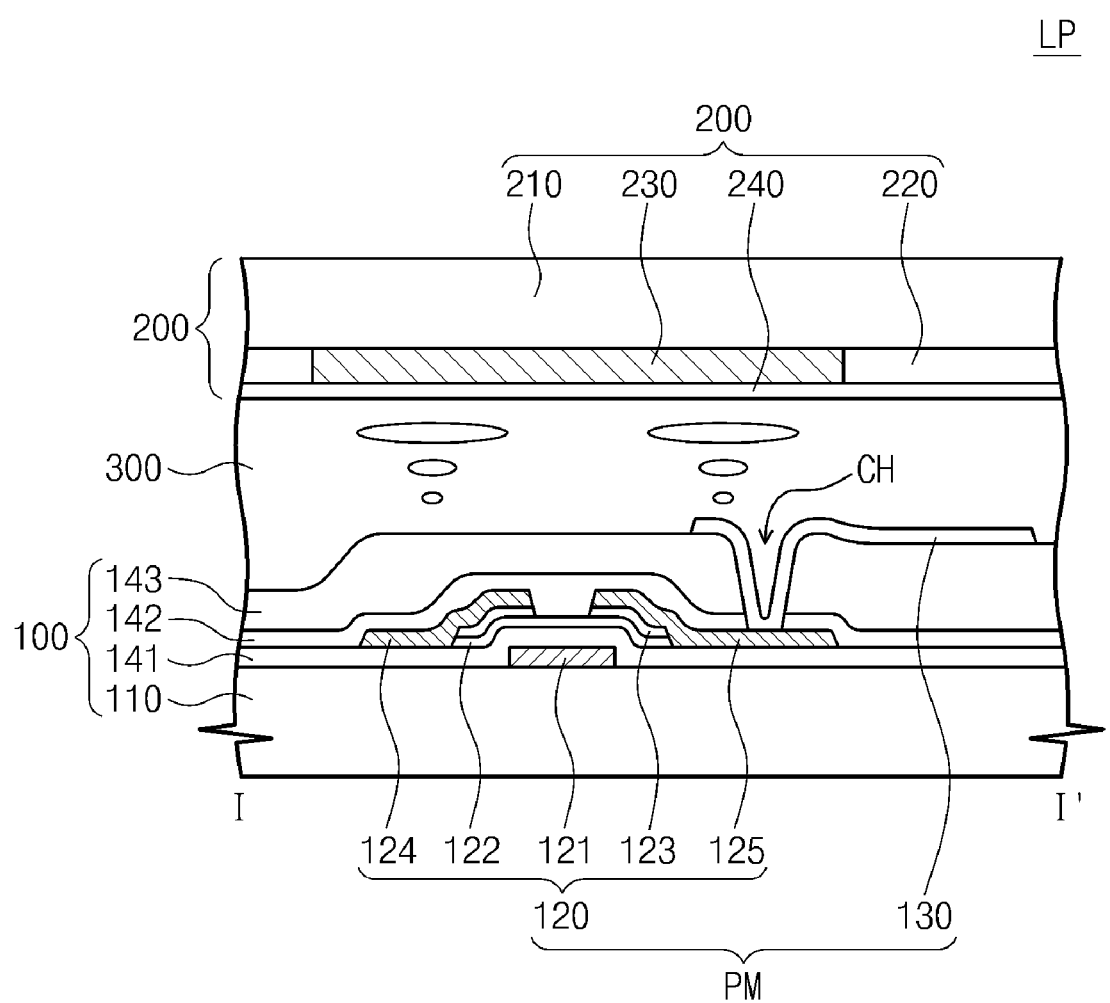
FIG. 2 is a sectional view taken along line I-I' of FIG. 1.

FIG. 1 is a plan view showing a liquid crystal display according to an exemplary embodiment of the present invention, and FIG. 2 is a sectional view taken along line I-I' of FIG. 1.

Referring to FIG. 1 and FIG. 2, a liquid crystal display (LCD) 600 includes a display panel LP to display an image, a data printed circuit board (PCB) 510 to output a data control signal corresponding to the image, a plurality of data tape carrier packages (TCPs) 520 to output a data signal in response to the data control signal, a gate PCB 530 to output a gate control signal corresponding to the image, and a plurality of gate TCPs to output a gate signal in response to the gate control signal.

The LCD panel LP includes an array substrate 100, an opposite substrate 200 coupled with the array substrate 100 and facing the array substrate 100, a liquid crystal layer 300 interposed between the array substrate 100 and the opposite substrate 200, and a conductive spacer member connecting the array substrate 100 and the opposite substrate 200.

The array substrate 100 includes a first base substrate 110, a plurality of gate lines, a plurality of data lines, a plurality of pixels, and a plurality of common voltage lines.

The first base substrate 110 is divided into a display area DA, in which the image is displayed, and a peripheral area PA adjacent to the display area DA. The peripheral area PA surrounds the display area DA and the image is not displayed in the peripheral area PA.

The gate lines include first to $n^{th}$ gate lines GL1~GLn (n is a natural number not less than 1) and are formed on the first base substrate 110. The first to $n^{th}$ gate lines GL1~GLn extend in a first direction D1 and transmit the gate signal applied by the gate TCPs 540.

The data lines includes first to $m^{th}$ data lines DL1~DLm (m is a natural number not less than 1) and are formed on the first base substrate 110. The first to $m^{th}$ data lines DL1~DLm extend in a second direction D2 substantially perpendicular to the first direction D1. The first to $m^{th}$ data lines DL1~DLm are insulated from and cross the first to $n^{th}$ gate lines GL1~GLn. Thus, a plurality of pixel areas is defined in the display area DA by the first to $n^{th}$ gate lines GL1~GLn and the first to $m^{th}$ data lines DL1~DLm. The first to $m^{th}$ data lines DL1~DLm transmit the data signal applied by the data TCPs 540.

One pixel PM is formed in each pixel area on the first base substrate 110. Each pixel PM includes a thin film transistor 120 and a pixel electrode 130. For example, the thin film transistor 120 formed in the second pixel area may include a gate electrode 121 branched from a first gate line GL1, an active layer 122 and an ohmic contact layer 123, a source electrode 124 branched from a second data line DL2 and formed on the ohmic contact layer 123, and a drain electrode 125 connected to the pixel electrode 130 formed in the second pixel area.

The array substrate 100 may further include a gate insulating layer 141 formed on the first base substrate 110 to cover the gate electrode 121 and the first to $n^{th}$ gate lines GL1~GLn. The array substrate 100 also further includes a protective layer 142 and an organic insulating layer 143 sequentially formed on the gate insulating layer 141 to cover the source and drain electrodes 124 and 125 and the first to $m^{th}$ data lines DL1~DLm. The pixel electrode 130 is formed on the organic insulating layer 143 and connected to the drain electrode 125 through a contact hole CH formed by partially removing the protective layer 142 and the organic insulating layer 143.

The data TCPs 520 are attached to a portion of the peripheral area PA adjacent to first ends of the first to $m^{th}$ data lines DL1~DLm. The data TCPs 520 connect the first to $m^{th}$ data lines DL1~DLm and the data PCB 510, and each data TCP 520 receives the data control signal from the data PCB 510 and outputs the data signal to a corresponding data line among the first to $m^{th}$ data lines DL1~DLm. The data signal is applied to the first to $m^{th}$ data lines DL1~DLm when the thin film transistors in one row are turned on in synchronization with the gate signal and is applied to the pixel electrode 130 through the thin film transistors.

Figure 3:
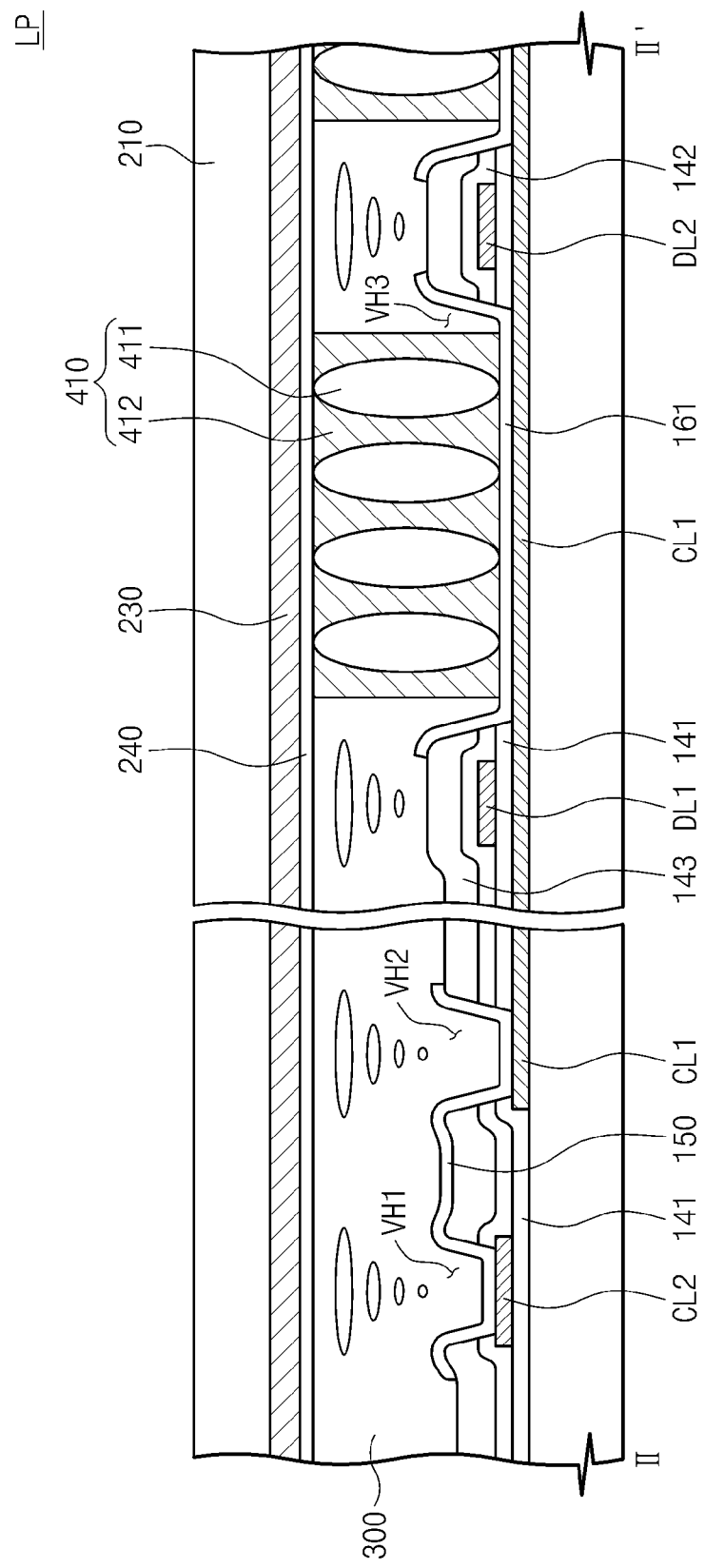
FIG. 3 is a sectional view taken along line II-II' of FIG. 1.

FIG. 3 is a sectional view taken along line II-II' of FIG. 1.

Referring to FIG. 1 and FIG. 3, the common voltage lines are formed in the peripheral area PA of the first base substrate 110 to receive the common voltage. The common voltage lines surround the display area DA and include a first common voltage line CL1 and a second common voltage line CL2. The first common voltage line CL1 is formed on the first base substrate 110 and covered by the gate insulating layer 141. The first common voltage line CL1 extends in the first direction D1 in the area where the first ends of the first to $m^{th}$ data lines DL1~DLm are formed and is insulated from and crosses the first to $m^{th}$ data lines DL1~DLm. Also, the first common voltage line CL1 extends in the second direction D2 in the area adjacent to the second ends of the first to $n^{th}$ gate lines GL1~GLn and is insulated from and spaced apart from the first to $n^{th}$ gate lines GL1~GLn. Further, the first common voltage line CL1 extends in the first direction D1 in the area adjacent to the second ends of the first to $m^{th}$ data lines DL1~DLm and is spaced apart from the first to $m^{th}$ data lines DL1~DLm.

The second common voltage line CL2 extends in the second direction D2 in the area where the first ends of the first to $n^{th}$ gate lines GL1~GLn are formed and is insulated from and crosses the first to $n^{th}$ gate lines GL1~GLn. That is, the second common voltage line CL2 may be formed on the gate insulating layer 141, so the second common voltage line CL2 may be arranged on a layer different from the layer on which the first common voltage line CL1 is arranged.

The protective layer 142 and the organic insulating layer 143 may be partially removed to form a first via hole VH1 on the second common voltage line CL2, and the gate insulating layer 141, the protective layer 142, and the organic insulating layer 143 may also be partially removed to form a second via hole VH2 on the first common voltage line CL1. The first and second common voltage lines CL1 and CL2 are connected to each other by a connecting electrode 150 connected to the first and second common voltage lines CL1 and CL2 through the first and second via holes VH1 and VH2.

Figure 4:
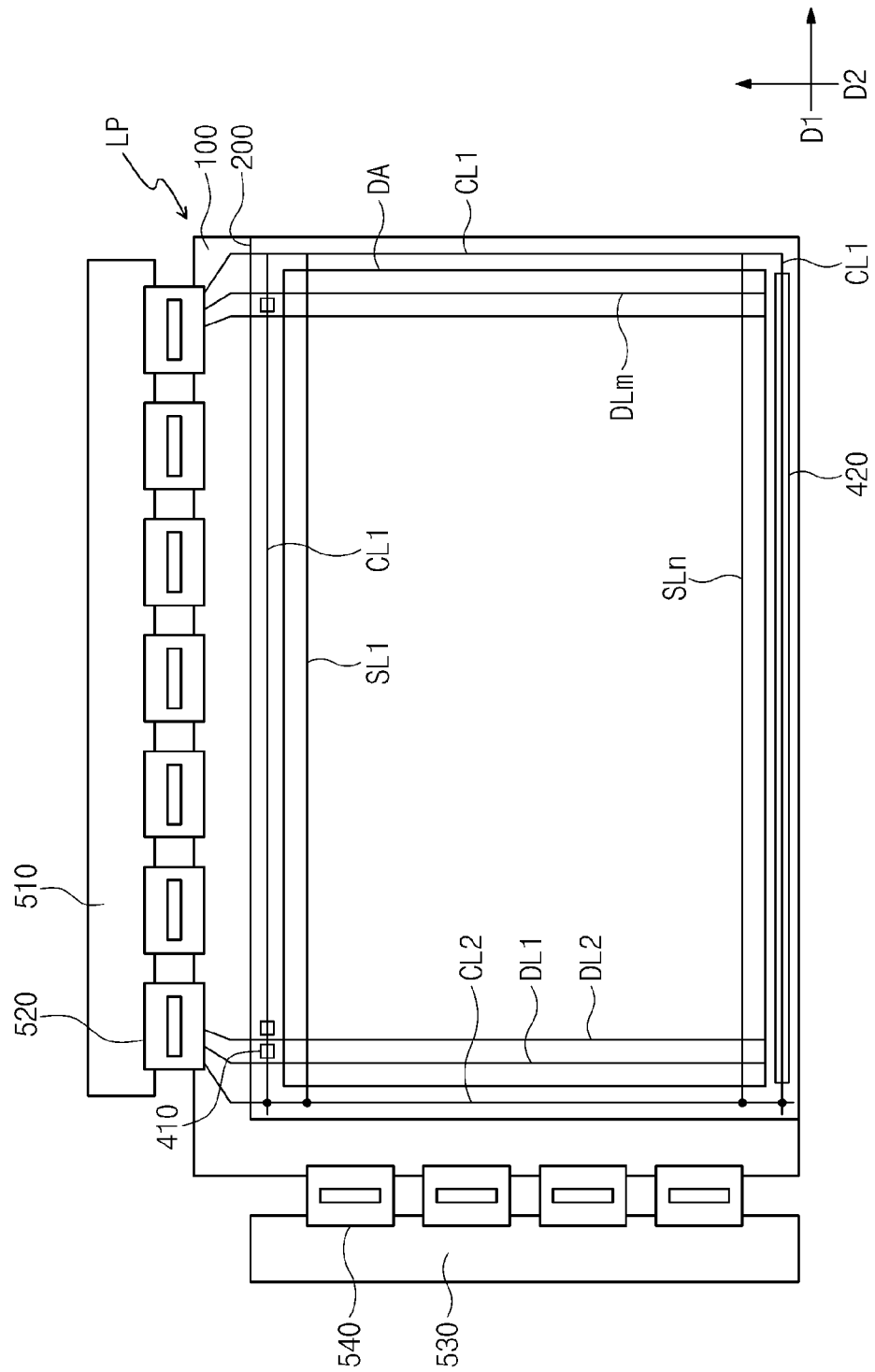
FIG. 4 is a plan view showing the liquid crystal display of FIG. 1.

FIG. 4 is a plan view showing the liquid crystal display of FIG. 1.

Referring to FIG. 4, the array substrate 110 further includes a plurality of storage lines SL1~SLn connected to the first and second common voltage lines CL1 and CL2 to receive the common voltage from the first and second common voltage lines CL1 and CL2. In FIG. 4, the gate lines GL1~GLn and the pixels PM are omitted to more clearly show the connection relation between the storage lines SL1~SLn and the first and second common voltage lines CL1 and CL2.

The storage lines SL1~SLn are formed on the first base substrate 110 and extend in the first direction D1. First ends of the storage lines SL1·SLn are connected to the second common voltage line CL2, and second ends of the storage lines SL1~SLn are connected to the first common voltage line CL1. The storage lines SL1~SLn transmit the common voltage input through the first and second common voltage lines CL1 and CL2 to form a storage capacitor in each pixel area.

Referring to FIG. 1 and FIG. 2 again, the opposite substrate 200 is disposed on the array substrate 100. The opposite substrate 200 may include a second base substrate 210, a color filter 220 formed on the second base substrate 210, a black matrix 230 formed on the second base substrate 210, and a common electrode 240 formed on the color filter 220 and the black matrix 230. The color filter 220 may include a plurality of color pixels displaying predetermined colors using light and may be formed in an area corresponding to the display area DA. The black matrix 230 may surround each color pixel in the area corresponding to the display area DA and may be formed in an area corresponding to the peripheral area PA. The black matrix 230 may include a metallic material such as chromium or photoresist having black-colored pigments to block the light. The common electrode 240 receives the common voltage through the first common voltage line CL1 and faces the pixel electrode 130 with the liquid crystal layer 300 is interposed therebetween.

When an electric field is applied to between the common electrode 240 and the pixel electrode 130, liquid crystal molecules of the liquid crystal layer 300 are aligned in response to the electric field, so the transmittance of the light incident from a rear of the LCD panel LP may be adjusted to display the image.

Referring to FIG. 1 and FIG. 3 again, the common electrode 240 may receive the common voltage from the first common voltage line CL1 through the conductive spacer member disposed between the common electrode 240 and the first common voltage line CL1. The conductive spacer member may include a plurality of first conductive spacers 410 and a second conductive spacer 420.

Figure 5:
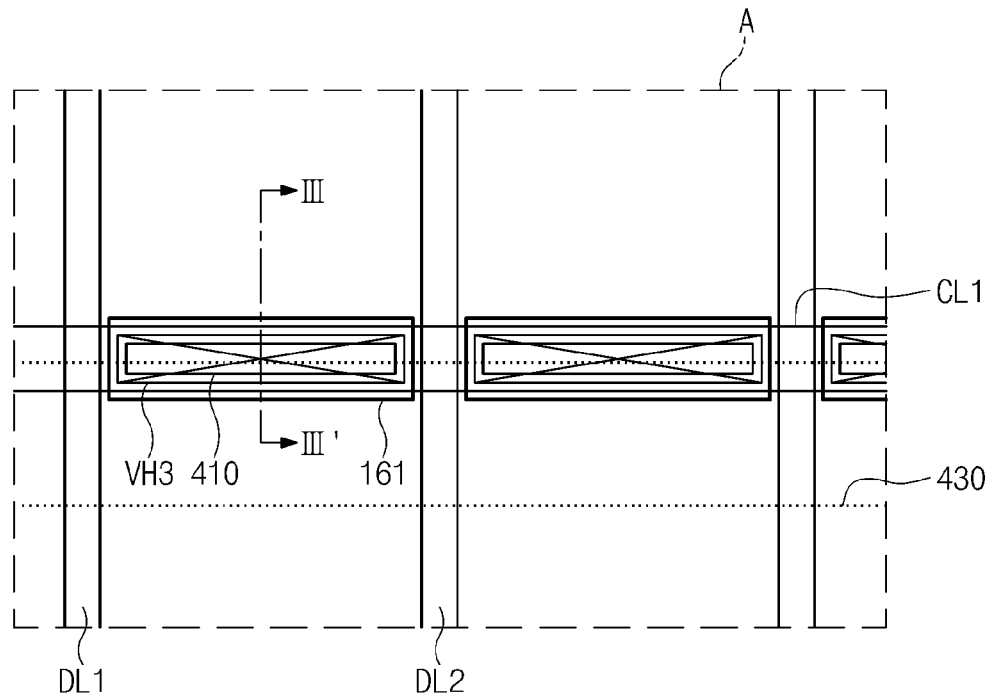
FIG. 5 is an enlarged plan view showing portion 'A' of FIG. 1.
Figure 6:
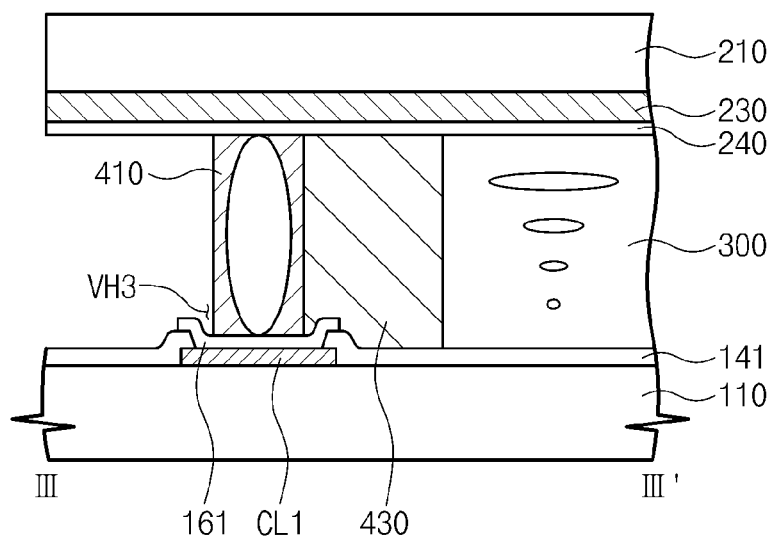
FIG. 6 is a sectional view taken along line III-III' of FIG. 5.

FIG. 5 is an enlarged plan view showing portion 'A' of FIG. 1, and FIG. 6 is a sectional view taken along line III-III' of FIG. 5.

Referring to FIG. 1, FIG. 3, and FIG. 5, the first conductive spacers 410 are formed in an area corresponding to the first common voltage line CL1. Each first conductive spacer 410 extends along the first common voltage line CL1 to have a bar-like shape. Each first conductive spacer 410 includes a first conductive ball 411 connecting the common electrode 240 and the first common voltage line CL1 and a first cover member 412 covering the first conductive ball 411. In the present exemplary embodiment, the first conductive ball 411 includes a conductive metal material includes silver and gold, the first cover member 412 includes a resin material. The first conductive spacer 410 may be arranged adjacent to the first ends of the first to m$^{th}$ data lines DL1~DLm and positioned between two adjacent data lines. In the present exemplary embodiment, one first conductive spacer 410 may be positioned between the first and second data lines DL1 and DL2. When viewed in a plan view, a portion of the first common voltage line CL1 exposed between the two adjacent data lines is covered by the first conductive spacer 410.

The gate insulating layer 141, the protective layer 142 and the organic insulating layer 143 may be partially removed to form third via holes VH3 through which the first common voltage line CL1 may be exposed. Each third via hole VH3 corresponds to the area in which the first conductive spacer 410 is formed.

The array substrate 100 may further include a first contact electrode 161 formed on the organic insulating layer 143 and connected to the first common voltage line CL1 through the third via hole VH3. In the present exemplary embodiment, the first contact electrode 161 includes a transparent conductive material such as indium tin oxide (ITO) or indium zinc oxide (IZO). The first conductive spacer 410 may be formed on the first contact electrode 161 and connected to the first contact electrode 161. Thus, the common voltage may be applied to the common electrode 240 from the first common voltage line CL1 through the first contact electrode 161 and the first conductive ball 411.

As described above, since the first conductive spacer 410 extends along the first common voltage line CL1, the first conductive spacer 410 may be more readily formed than when the first conductive spacer 410 has a point-like shape. Thus, the process time needed to form the first conductive spacer 410 may be shortened, thereby improving productivity. Also, a contact area between the array substrate 100 and the opposite substrate 200 increases by the first conductive spacer 410, so that the contact resistance between the array substrate 100 and the opposite substrate 200 may be reduced, thereby preventing crosstalk.

Referring to FIG. 5 and FIG. 6, the LCD panel LP may further include a sealant 430 to couple the array substrate 100 with the opposite substrate 200. The sealant 430 may be formed in the peripheral area PA and arranged between the array substrate 100 and the opposite substrate 200 to seal the liquid crystal layer 300. In the present exemplary embodiment, the first conductive spacer 410 is positioned outside the sealant 430. When viewed in a plan view, the area in which the first conductive spacer 410 is formed may partially overlap with the area in which the sealant 430 is formed.

Figure 7:
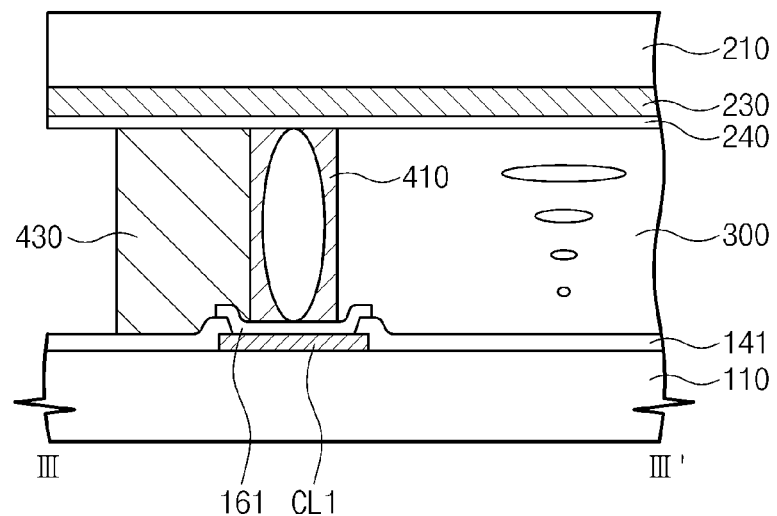
FIG. 7 is a sectional view showing the relationship between a sealant and a first conductive spacer according to another exemplary embodiment of the present invention.

FIG. 7 is a sectional view showing the relationship between a sealant and a first conductive spacer according to another exemplary embodiment of the present invention.

Referring to FIG. 7, the first conductive spacer 410 may be positioned between the sealant 430 and the liquid crystal layer 300. Thus, the first conductive spacer 410 may prevent corrosion of the first common voltage line CL1, misalignment between the first conductive spacer 410 and the first common voltage line CL1 due to the sealant 430, and intrusion of the sealant 430 into the liquid crystal layer 300.

Figure 8:
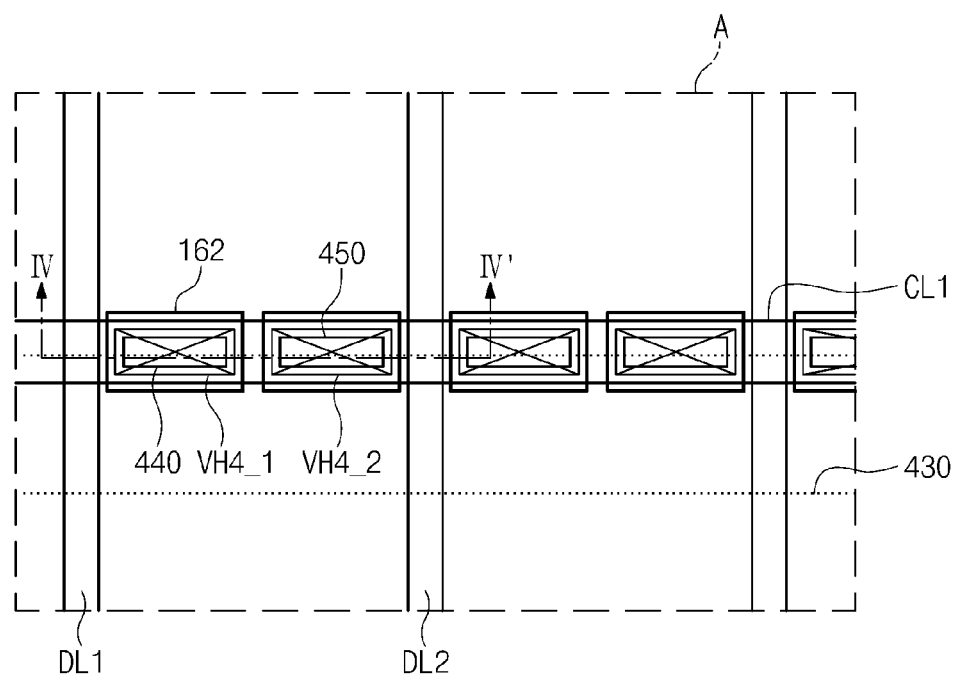
FIG. 8 is a plane view showing a first conductive spacer and a third via hole according to another exemplary embodiment of the present invention.
Figure 9:
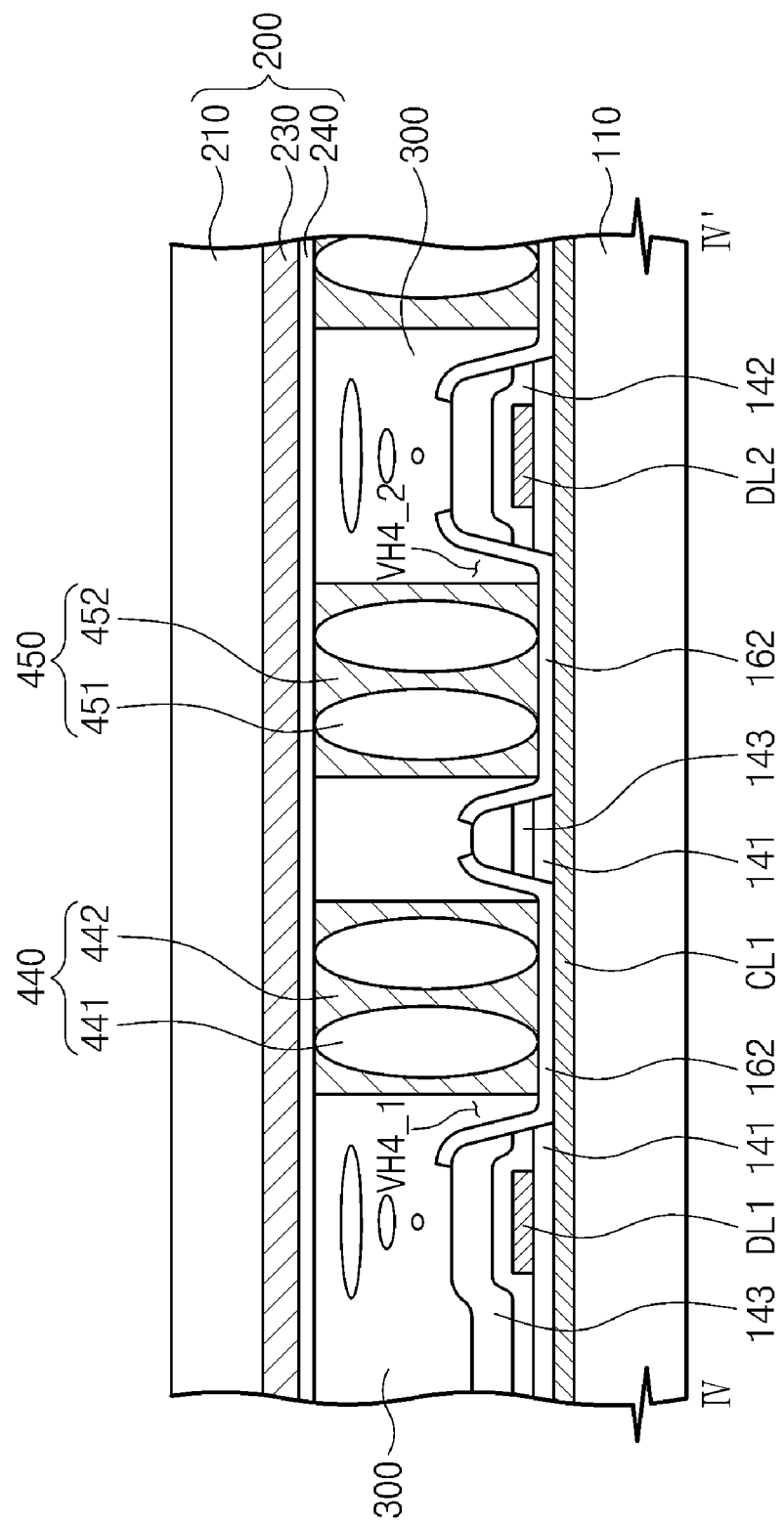
FIG. 9 is a sectional view taken along line IV-IV' of FIG. 8.

FIG. 8 is a plan view showing a first conductive spacer and a third via hole according to another exemplary embodiment of the present invention, and FIG. 9 is a sectional view taken along line IV-IV' of FIG. 8.

Referring to FIG. 8 and FIG. 9, first conductive spacers 440 and 450 are formed adjacent to the first ends of the first to m$^{th}$ data lines DL1~DLm (refer to FIG. 1) and partially formed in an area corresponding to the first common voltage line CL1. Each first conductive spacer 440 and 450 extends along the first common voltage line CL1 and may have a bar-like shape. Also, each first conductive spacer 440 and 450 may include a plurality of first conductive balls 441 and 451 to connect the common electrode 240 and the first common voltage line CL1 and a first cover member 442 and 452 covering the first conductive balls 441 and 451, respectively. In the present exemplary embodiment, the first conductive balls 441 and 451 include a conductive metal material includes silver and gold, the first cover member 442 and 452 includes a resin material. The first conductive spacers 440 and 450 are positioned between two adjacent data lines. In the present exemplary embodiment, the first conductive spacers 440 and 450 are spaced apart from each other between the first data line DL1 and the second data line DL2. When viewed in a plan view, a portion of the first common voltage line CL1, which is exposed between the two adjacent data lines DL1 and DL2, is covered by the first conductive spacers 440 and 450.

The gate insulating layer 141, the protective layer 142 and the organic insulating layer 143 may be partially removed to form third via holes VH4_1 and VH4_2 through which the first common voltage line CL1 may be exposed. The third via holes VH4_1 and VH4_2 may be positioned corresponding to the first conductive spacers 440 and 450, respectively. Therefore, two third via holes VH4_1 and VH4_2 are formed between the two adjacent data lines DL1 and DL2.

First contact electrodes 162 may be formed in the third via holes VH4_1 and VH4_2, respectively, such that the first contact electrodes 162 are connected to the first common voltage line CL1. In the present exemplary embodiment, the first contact electrodes 162 include a transparent conductive material such as ITO or IZO. The first conductive spacers 440 and 450 may be formed on the first contact electrodes 162, respectively, and connected to the first contact electrodes 162. Thus, the common voltage may be applied to the common electrode 240 through the first contact electrodes 162 and the first conductive balls 441 and 451 from the first common voltage lines CL1.

In the present exemplary embodiment, the first conductive spacers 440 and 450 may be positioned outside the sealant 430, and the area where the first conductive spacers 440 and 450 are formed partially overlaps the area where the sealant 430 is formed. However, the first conductive spacers 440 and 450 may be positioned between the sealant 430 and the liquid crystal layer 300.

Figure 10:
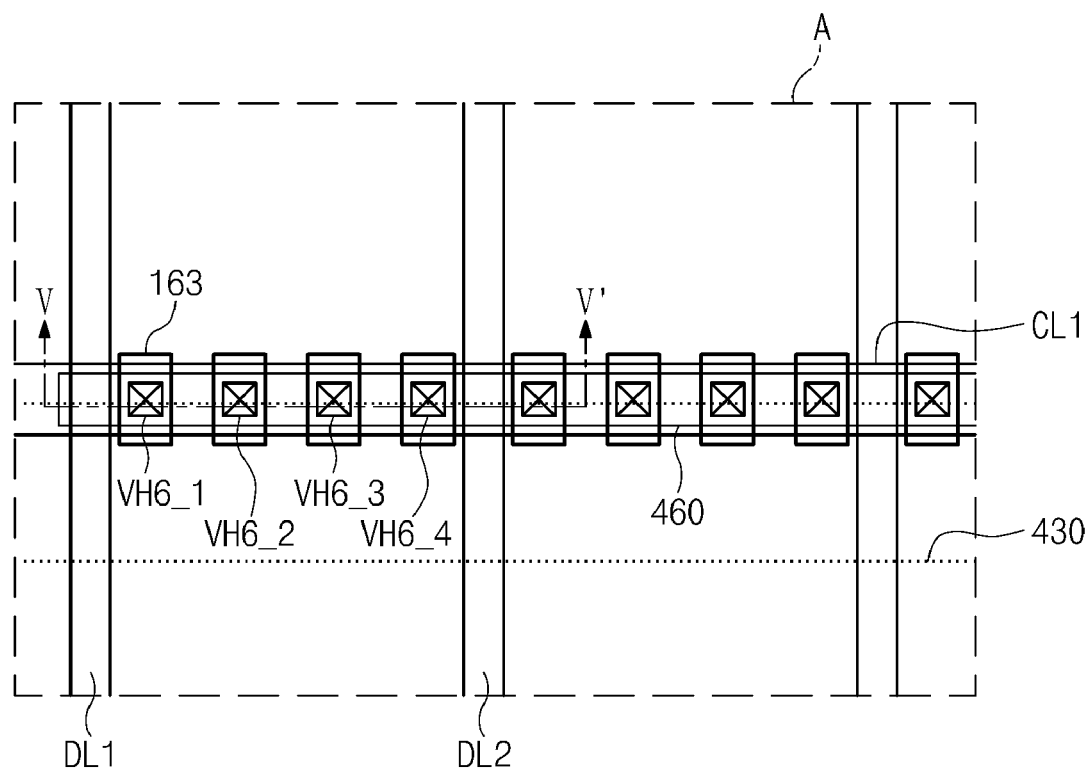
FIG. 10 is a plan view showing a first conductive spacer and a third via hole according to another exemplary embodiment of the present invention.
Figure 11:
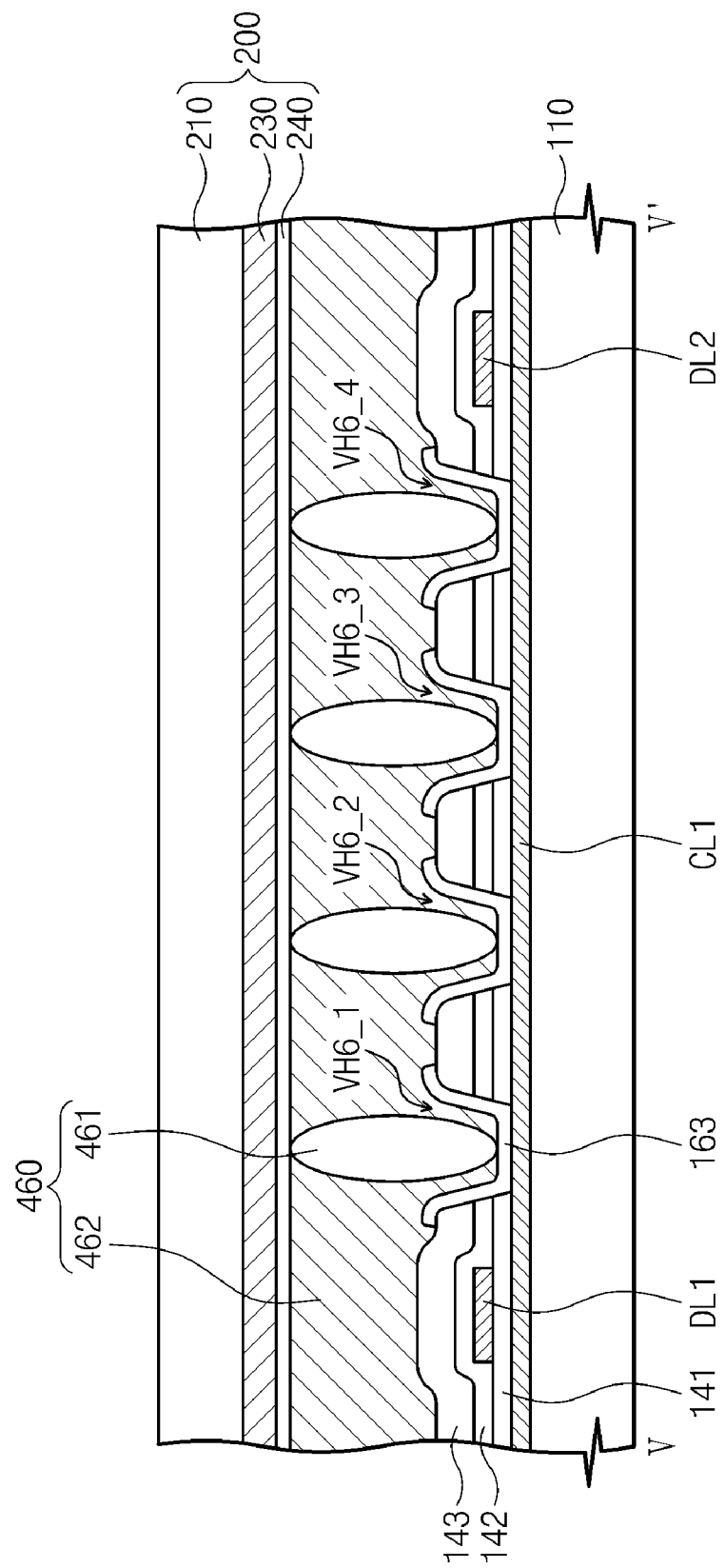
FIG. 11 is a sectional view taken along line V-V' of FIG. 10.

FIG. 10 is a plan view showing a first conductive spacer and a third via hole according to another exemplary embodiment of the present invention, and FIG. 11 is a sectional view taken along line V-V' of FIG. 10.

Referring to FIG. 10 and FIG. 11, a first conductive spacer 460 may be formed adjacent to the first ends of the first to $m^{th}$ data lines DL1~DLm (refer to FIG. 1) and formed partially in the area corresponding to the first common voltage line CL1. The first conductive spacer 460 extends along the first common voltage line CL1, may have a bar-like shape, and is insulated from and crosses the first to $m^{th}$ data lines DL1~DLm. The first conductive spacer 460 may include a plurality of conductive balls 461 to connect the first common voltage line CL1 and the common electrode 240 and a first cover member 462 covering the first conductive balls 461. In the present exemplary embodiment, the first conductive balls 461 include a conductive metal material includes silver and gold, the first cover member 462 includes a resin material.

In the present exemplary embodiment, the gate insulating layer 141, the protective layer 142, and the organic insulating layer 143 may be partially removed to form four third via holes VH6_1, VH6_2, VH6_3, and VH6_4 between the first and second data lines DL1 and DL2, through which the first common voltage line CL1 may be exposed. The number of the third via holes may be increased or decreased depending on the distance between the first and second data lines DL1 and DL2. Also, the size of the third via holes VH6_1, VH6_2, VH6_3, and VH6_4 may be increased or decreased.

First contact electrodes 163 may be formed in each third via hole VH6_1, VH6_2, VH6_3, and VH6_4, respectively, such that the first contact electrodes 163 are connected to the first common voltage line CL1. In the present exemplary embodiment, the first contact electrodes 163 include a transparent conductive material such as ITO or IZO. The first conductive spacer 460 may be arranged on the first contact electrodes 163, and connected to the first contact electrodes 163. Thus, the common voltage may be applied to the common electrode 240 from the first common voltage line CL1 through the first contact electrodes 163 and the first conductive balls 461.

In the present exemplary embodiment, the first conductive spacer 460 may be positioned outside the sealant 430, and the area where the first conductive spacer 460 is formed overlaps the area where the sealant 430 is formed. However, the first conductive spacer 460 may be positioned inside the sealant 430 such that the first conductive spacer 460 is positioned between the sealant 430 and the liquid crystal layer 300.

Figure 12:
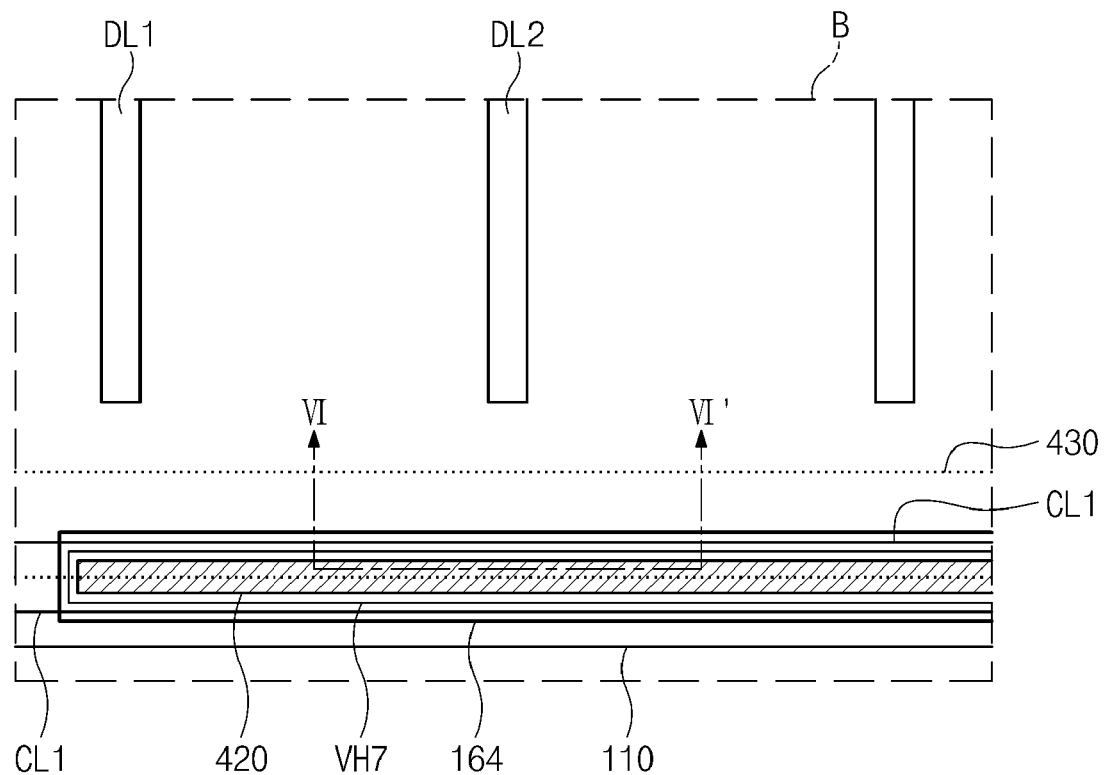
FIG. 12 is an enlarged view showing portion 'B' of FIG. 1.
Figure 13:
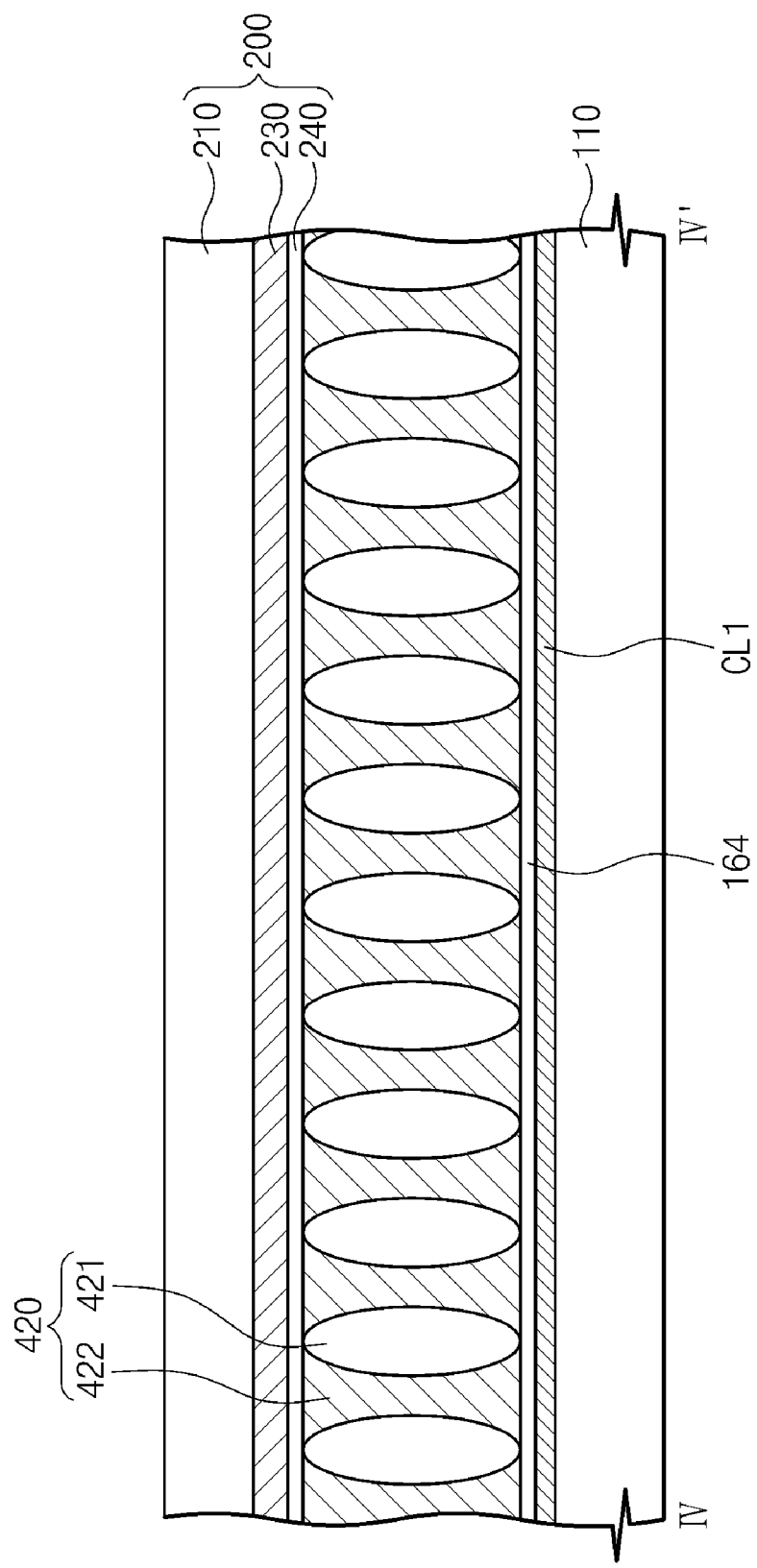
FIG. 13 is a sectional view taken along line VI-VI' of FIG. 12.

FIG. 12 is an enlarged view showing portion 'B' of FIG. 1, and FIG. 13 is a sectional view taken along line VI-VI' of FIG. 12.

Referring to FIG. 1 and FIG. 12, the second conductive spacer 420 may be formed adjacent to the second ends of the first to $m^{th}$ data lines DL1~DLm. The second conductive spacer 420 may be spaced apart from the first to $m^{th}$ data lines DL1~DLm and positioned at the area corresponding to the area where the first common voltage line CL1 is formed. In the present exemplary embodiment, the second conductive spacer 420 is successively formed along the first common voltage line CL1 and may have a bar-like shape. In FIG. 1 and FIG. 12, the array substrate 100 may include one second conductive spacer 420, but the array substrate 100 may further include plural second conductive spacers 420. If the array substrate 100 includes plural second conductive spacers 420, the second conductive spacers 420 may be arranged in the first direction D1 and spaced apart from each other.

Referring to FIG. 12 and FIG. 13, the gate insulating layer 141, the protective layer 142 and the organic insulating layer 143 may be partially removed to form a second via hole VH7 through which the first common voltage line CL1 may be exposed. The array substrate 100 further includes a second contact electrode 164 connected to the first common voltage line CL1 through the second via hole VH7. In the present exemplary embodiment, the second contact electrode 164 includes a transparent conductive material such as ITO or IZO. The second conductive spacer 420 may be arranged on the second contact electrode 164. The second conductive spacer 420 includes a plurality of second conductive balls 421 to connect the second contact electrode 164 and the common electrode 240 and a second cover member 422 covering the second conductive balls 421. In the present exemplary embodiment, the second conductive balls 421 include a conductive metal material includes silver and gold, the second cover member 422 includes a resin material. Thus, the common voltage may be applied to the common electrode 240 from the first common voltage line CL1 through the second contact electrode 164 and the second conductive balls 421.

As described above, since the second conductive spacer 420 may have a bar-like shape, the second conductive spacer 420 may be more readily formed than when the second conductive spacer 420 has a point-like shape. Thus, the process time needed to form the second conductive spacer 420 may be shortened, which may improve productivity. Also, the contact area between the array substrate 100 and the opposite substrate 200 may be increased by the second conductive spacer 420, so the contact resistance between the array substrate 100 and the opposite substrate 200 may be reduced, thereby preventing crosstalk.

Hereinafter, the contact resistance between the array substrate 100 and the opposite substrate 200 when a conventional conductive spacer having a point-like shape is applied to an LCD panel is compared to a case where first and second conductive spacers 410 and 420 having bar-like shapes with reference to drawings and a table.

Figure 14:
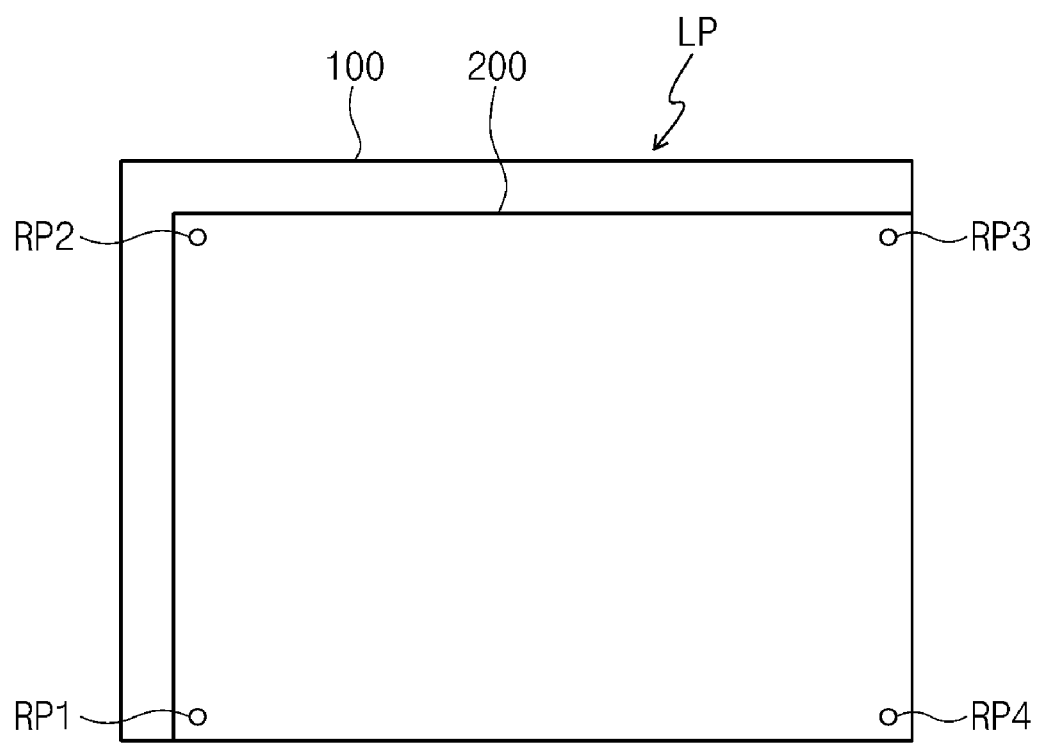
FIG. 14 is a plan view showing points for measuring a contact resistance on the liquid crystal display panel of FIG. 1.

FIG. 14 is a plan view showing points for measuring contact resistance on the liquid crystal display panel of FIG. 1.

Referring to FIG. 14, when the contact resistance between the array substrate 100 and the opposite substrate 200 is greater than a predetermined contact resistance, crosstalk may occur in the LCD panel LP.

The contact resistance between the array substrate 100 and the opposite substrate 200 represents the resistance of a path defined by first, second, third, and fourth measuring points RP1, RP2, RP3, and RP4. The first, second, third, and fourth measuring points RP1, RP2, RP3, and RP4 are adjacent to four corners of the opposite substrate 200, respectively. That is, the first measuring point RP1 is adjacent to a lower left corner, the second measuring point RP2 is adjacent to an upper left corner, the third measuring point RP3 is adjacent to an upper right corner, and the fourth measuring point RP4 is adjacent to a lower right corner.

Table I represents the resistance of paths defined by the first, second, third, and fourth measuring points RP1, RP2, RP3, and RP4.

TABLE I

| | First and second conductive spacers | | | |
|---|---|---|---|---|
| | RP1 -> RP2 | RP1 -> RP2 -> RP3 | RP1 -> RP2 -> RP3 -> RP4 | RP2 -> RP3 -> RP4 |
| Bar-like shape | 213Ω | 272Ω | 283Ω | 275Ω |
| Point-like shape | 311Ω | 437Ω | 452Ω | 414Ω |

Referring to Table I, in order to measure the contact resistance between the array substrate 100 and the opposite substrate 200, the contact resistances of the paths between the first and second measuring points RP1 and RP2 (RP1->RP2), between the first, second, and third measuring points RP1, RP2, and RP3 (RP1->RP2->RP3), between the first, second, third, and fourth measuring points RP1, RP2, RP3, and RP4 (RP1->RP2->RP3->RP4), and between the second, third, and fourth measuring points RP2, RP3, and RP4 (RP2->RP3->RP4) have been measured.

In each path, when the first and second conductive spacers have a bar-like shape, the contact resistance is lower than when the first and second conductive spacers have a point-like shape. In other words, when the first and second conductive spacers have a bar-like shape, the contact area between the conductive spacers and the array substrate 100 increases, so the contact resistance between the array substrate 100 and the opposite substrate 200 decreases.

According to the display panel, the LCD panel includes the conductive spacers to connect the common voltage lines and the common electrode, and the conductive spacers have a bar-like shape. Thus, the number of processes required for the conductive spacers may decrease, so the process time for the LCD panel may also decrease and the productivity of the LCD panel may be improved.

Further, since the contact area where the conductive spacers contact the array substrate increases, the contact resistance between the array substrate and the opposite substrate may decrease and crosstalk may be prevented, which may improve the display quality of the LCD panel.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A display panel, comprising:
an array substrate comprising a plurality of pixels to display an image and a common voltage line to transmit a common voltage, a first base substrate comprising a display area where the pixels are arranged and a peripheral area adjacent to the display area, and a plurality of signal lines arranged on the first base substrate to transmit an image signal corresponding to the image to the pixels, the common voltage line being arranged in the peripheral area and insulated from the signal lines;
an opposite substrate comprising a common electrode to receive the common voltage from the common voltage line;
a coupling member arranged between the array substrate and the opposite substrate to couple the array substrate and the opposite substrate; and
a conductive spacer member arranged in a portion of a region between the common electrode and the common voltage line, the conductive spacer member comprising a plurality of conductive balls to connect the common electrode to the common voltage line and a cover member covering the conductive balls, having a bar-like shape and extending along the common voltage line, the conductive spacer member arranged at a side of the coupling member,
wherein the conductive spacer member comprises at least one first conductive spacer arranged adjacent to a first end of the signal lines and at least one second conductive spacer arranged adjacent to a second end of the signal lines,
wherein the array substrate further comprises a first insulation layer arranged between the common voltage line and the signal lines to insulate the common voltage line from the signal lines and a second insulation layer arranged on the first insulation layer to cover the signal lines, and
wherein the first insulation layer and the second insulation layer are partially removed to provide a first via hole and a second via hole formed therethrough, the first conductive spacer is connected to the common voltage line through the first via hole, and the second conductive spacer is connected to the common voltage line through the second via hole.

2. The display panel of claim 1, wherein the first conductive spacer is arranged between two adjacent signal lines.

3. The display panel of claim 2, wherein the first via hole is provided in an area corresponding to the first conductive spacer.

4. The display panel of claim 1, wherein two adjacent first conductive spacers are spaced apart from each other.

5. The display panel of claim 1, wherein the first conductive spacer is connected to the common voltage line through two adjacent first via holes.

6. The display panel of claim 5, wherein the first conductive spacer extends along the common voltage line, crosses the signal lines, and is insulated from the signal lines.

7. The display panel of claim 1, wherein the second via hole is provided in an area corresponding to the second conductive spacer.

8. The display panel of claim 7, wherein the second conductive spacer extends along the common voltage line.

9. The display panel of claim 7, wherein two adjacent second conductive spacers are spaced apart from each other.

10. The display panel of claim 1, wherein the array substrate further comprises:

a first contact electrode arranged in the first via hole and between the common voltage line and the first conductive spacer, the common electrode being connected to the common voltage line via the first contact electrode and the first conductive spacer; and a second contact electrode arranged in the second via hole and between the common voltage line and the second conductive spacer, the common electrode being connected to the common voltage line via the second contact electrode and the second conductive spacer.

11. The display panel of claim 1, further comprising a liquid crystal layer arranged between the array substrate and the opposite substrate to control a transmittance of light in response to an electric field applied between the pixels and the common electrode, the liquid crystal layer surrounded by the coupling member.

12. A display panel, comprising:

an array substrate comprising a plurality of pixels to display an image and a common voltage line to transmit a common voltage;

an opposite substrate comprising a common electrode to receive the common voltage from the common voltage line;

a coupling member arranged between the array substrate and the opposite substrate to couple the array substrate and the opposite substrate; and a conductive spacer member arranged in a portion of a region between the common electrode and the common voltage line, the conductive spacer member comprising a plurality of conductive balls to connect the common electrode to the common voltage line and a cover member covering the conductive balls, having a bar-like shape and extending along the common voltage line, the conductive spacer member arranged at a side of the coupling member, wherein an area corresponding to the conductive spacer member partially overlaps an area corresponding to the coupling member.

* * * * *